(12) United States Patent
Wang (10) Patent No.: US 12,471,985 B2
(45) Date of Patent: Nov. 18, 2025

(54) RF ABLATION SYSTEMS AND METHODS INCLUDING A CANNULA WITH CONTACTS OR A CONNECTOR

(71) Applicant: Boston Scientific Neuromodulation Corporation, Valencia, CA (US)

(72) Inventor: Kevin Peng Wang, Fremont, CA (US)

(73) Assignee: Boston Scientific Neuromodulation Corporation, Valencia, CA (US)

( * ) Notice: Subject to any disclaimer, the term of this patent is extended or adjusted under 35 U.S.C. 154(b) by 983 days.

(21) Appl. No.: 17/574,400

(22) Filed: Jan. 12, 2022

(65) Prior Publication Data

US 2022/0226039 A1 Jul. 21, 2022

Related U.S. Application Data

(60) Provisional application No. 63/138,092, filed on Jan. 15, 2021.

(51) Int. Cl.
*A61B 18/14* (2006.01)
*A61B 17/34* (2006.01)
(Continued)

(52) U.S. Cl.
CPC ......... *A61B 18/1477* (2013.01); *A61M 39/10* (2013.01); *A61B 17/3476* (2013.01);
(Continued)

(58) Field of Classification Search
CPC ...... A61B 17/3476; A61B 2018/00029; A61B 2018/00077; A61B 2018/00172;
(Continued)

(56) References Cited

U.S. PATENT DOCUMENTS

| 4,411,266 A | 10/1983 | Cosman |
| 4,565,200 A | 1/1986 | Cosman |

(Continued)

FOREIGN PATENT DOCUMENTS

| WO | 99/40859 | 8/1999 |
| WO | 99/40860 | 8/1999 |

(Continued)

OTHER PUBLICATIONS

Hemostasis Vales—Qosina—URL: hllps://www.qosina.com/vascular-access-hemostasis-valves 9 pages—retrieved Nov. 13, 2019.

(Continued)

*Primary Examiner* — Linda C Dvorak
*Assistant Examiner* — Bradford C. Blaise
(74) *Attorney, Agent, or Firm* — Branch Partners PLLC; Bruce E. Black (57) ABSTRACT

An RF ablation cannula includes a cannula shaft; an active tip as part of, or coupled to, the cannula shaft; a cannula hub coupled to the cannula shaft, the cannula hub including at least a first cannula contact and a second cannula contact, wherein the first cannula contact is electrically coupled to the active tip; and a wire extending along the cannula shaft and attached to the active tip or cannula shaft to form a thermocouple, wherein the wire is electrically coupled to the second cannula contact. As an addition to, or an alternative to, the cannula contacts, the cannula hub can include a connector with connector pins or contacts coupled to the active tip and wire.

20 Claims, 8 Drawing Sheets

(51) Int. Cl.
*A61B 18/00* (2006.01)
*A61M 39/10* (2006.01)

(52) U.S. Cl.
CPC ............ *A61B 2018/00029* (2013.01); *A61B 2018/00077* (2013.01); *A61B 2018/00178* (2013.01); *A61B 2018/00577* (2013.01); *A61B 2018/00821* (2013.01); *A61M 2039/1022* (2013.01)

(58) Field of Classification Search
CPC .......... A61B 2018/00178; A61B 2018/00577; A61B 2018/00821; A61M 39/10; A61M 2039/1022; A61M 2039/1077
See application file for complete search history.

(56) References Cited

U.S. PATENT DOCUMENTS

| | | | |
|---|---|---|---|
| 4,566,454 A | 1/1986 | Mehl et al. | |
| 4,597,379 A | 7/1986 | Kihn et al. | |
| 4,727,874 A | 3/1988 | Bowers et al. | |
| 4,807,620 A | 2/1989 | Strul et al. | |
| 5,360,009 A | 11/1994 | Herskovitz | |
| 5,433,739 A | 7/1995 | Sluijter et al. | |
| 5,571,147 A | 11/1996 | Sluijter et al. | |
| 5,728,143 A | 3/1998 | Gough et al. | |
| 5,769,847 A | 6/1998 | Panescu et al. | |
| 5,925,041 A * | 7/1999 | Long ............... | A61B 17/34 606/41 |
| 5,951,546 A | 9/1999 | Lorentzen | |
| 5,983,141 A | 11/1999 | Sluijter et al. | |
| 6,070,845 A | 6/2000 | Herskovitz | |
| 6,104,959 A | 8/2000 | Spertell | |
| 6,161,048 A | 12/2000 | Sluijter et al. | |
| 6,187,002 B1 * | 2/2001 | Long ............... | A61B 18/1487 604/165.01 |
| 6,203,524 B1 | 3/2001 | Burney et al. | |
| 6,245,065 B1 | 6/2001 | Panescu et al. | |
| 6,246,912 B1 | 6/2001 | Sluijter et al. | |
| 6,259,952 B1 | 7/2001 | Sluijter et al. | |
| 6,301,506 B1 | 10/2001 | Den Boer et al. | |
| 6,321,120 B1 | 11/2001 | Surbeck et al. | |
| 6,341,429 B1 | 1/2002 | Herskovitz | |
| 6,397,106 B1 | 5/2002 | DeBrouse | |
| 6,402,739 B1 | 6/2002 | Neev | |
| 6,428,537 B1 | 8/2002 | Swanson et al. | |
| 6,440,127 B2 | 8/2002 | McGovern et al. | |
| 6,447,505 B2 | 9/2002 | McGovern et al. | |
| 6,482,204 B1 | 11/2002 | Lax et al. | |
| 6,517,534 B1 | 2/2003 | McGovern et al. | |
| 6,530,922 B2 | 3/2003 | Cosman et al. | |
| 6,692,493 B2 | 2/2004 | McGovern et al. | |
| 6,743,226 B2 | 6/2004 | Cosman et al. | |
| 6,843,789 B2 | 1/2005 | Goble | |
| 6,853,864 B2 | 2/2005 | Litovitz | |
| 6,869,430 B2 | 3/2005 | Balbierz et al. | |
| 7,022,115 B1 * | 4/2006 | Meier ............... | A61N 1/0551 604/164.11 |
| 7,363,071 B2 | 4/2008 | Damasco et al. | |
| 7,522,953 B2 | 4/2009 | Kaula et al. | |
| 7,553,309 B2 | 6/2009 | Buysse et al. | |
| 7,574,257 B2 | 8/2009 | Rittman, III | |
| 7,725,155 B2 | 5/2010 | Dowlatshahi | |
| 7,749,218 B2 | 7/2010 | Pellegrino et al. | |
| 7,799,024 B2 | 9/2010 | Randall | |
| 7,914,350 B1 * | 3/2011 | Bozich ............... | H01R 11/24 439/759 |
| 8,123,782 B2 | 2/2012 | Altarac et al. | |
| 8,128,662 B2 | 3/2012 | Altarac et al. | |
| 8,273,108 B2 | 9/2012 | Altarac et al. | |
| 8,277,488 B2 | 10/2012 | Altarac et al. | |
| 8,292,922 B2 | 10/2012 | Altarac et al. | |
| 8,361,607 B2 | 1/2013 | Higuchi et al. | |
| 8,425,559 B2 | 4/2013 | Altarac et al. | |
| 8,512,333 B2 | 8/2013 | Epstein et al. | |
| 8,518,037 B2 | 8/2013 | Young | |
| 8,613,747 B2 | 12/2013 | Altarac et al. | |
| 8,808,284 B2 | 8/2014 | Pellegrino et al. | |
| 8,864,828 B2 | 10/2014 | Altarac et al. | |
| 8,945,183 B2 | 2/2015 | Altarac et al. | |
| 8,979,830 B2 | 3/2015 | Hennings | |
| 8,992,522 B2 | 3/2015 | Pellegrino et al. | |
| 9,039,701 B2 | 5/2015 | Pellegrino et al. | |
| 9,119,680 B2 | 9/2015 | Altarac et al. | |
| 9,155,570 B2 | 10/2015 | Altarac et al. | |
| 9,155,572 B2 | 10/2015 | Altarac et al. | |
| 9,161,783 B2 | 10/2015 | Altarac et al. | |
| 9,173,676 B2 | 11/2015 | Pellegrino et al. | |
| 9,186,186 B2 | 11/2015 | Reglos et al. | |
| 9,393,055 B2 | 7/2016 | Altarac et al. | |
| 9,532,812 B2 | 1/2017 | Altarac et al. | |
| 9,572,603 B2 | 2/2017 | Altarac et al. | |
| 9,717,552 B2 | 8/2017 | Cosman et al. | |
| 9,861,398 B2 | 1/2018 | Altarac et al. | |
| 9,956,011 B2 | 5/2018 | Altarac et al. | |
| 9,956,032 B1 | 5/2018 | Cosman et al. | |
| 10,080,587 B2 | 9/2018 | Altarac et al. | |
| 10,111,703 B2 | 10/2018 | Cosman, Jr. et al. | |
| 10,136,937 B1 | 11/2018 | Cosman, Jr. et al. | |
| 10,136,942 B1 | 11/2018 | Cosman, Jr. et al. | |
| 10,136,943 B1 | 11/2018 | Cosman, Jr. et al. | |
| 10,166,047 B2 | 1/2019 | Altarac et al. | |
| 10,194,971 B2 | 2/2019 | Wegrzyn, III et al. | |
| 10,342,606 B2 | 7/2019 | Cosman et al. | |
| 10,357,258 B2 | 7/2019 | Patel et al. | |
| 10,363,063 B2 | 7/2019 | Cosman | |
| 10,420,591 B2 | 9/2019 | Snell et al. | |
| 10,463,423 B2 | 11/2019 | Sutton et al. | |
| 10,478,246 B2 | 11/2019 | Pellegrino et al. | |
| 10,517,611 B2 | 12/2019 | Patel et al. | |
| 10,548,654 B2 | 2/2020 | Curley | |
| 10,588,687 B2 | 3/2020 | Cosman, Jr. et al. | |
| 10,610,267 B2 | 4/2020 | Altarac et al. | |
| 10,631,915 B1 | 4/2020 | Cosman | |
| 10,639,098 B2 | 5/2020 | Cosman et al. | |
| 10,639,101 B2 | 5/2020 | Cosman et al. | |
| 10,653,456 B2 | 5/2020 | Altarac et al. | |
| 10,709,502 B2 | 7/2020 | Viswanathan | |
| 10,835,295 B2 | 11/2020 | Altarac et al. | |
| 10,835,297 B2 | 11/2020 | Altarac et al. | |
| 11,013,539 B2 | 5/2021 | Altarac et al. | |
| 11,076,893 B2 | 8/2021 | Altarac et al. | |
| 11,207,100 B2 | 12/2021 | Donovan et al. | |
| 11,229,461 B2 | 1/2022 | Altarac et al. | |
| 2002/0077683 A1 | 6/2002 | Westlund et al. | |
| 2002/0156472 A1 | 10/2002 | Lee et al. | |
| 2002/0165531 A1 | 11/2002 | Goble | |
| 2003/0032951 A1 | 2/2003 | Rittman et al. | |
| 2003/0109802 A1 * | 6/2003 | Laeseke ............ | A61B 18/1477 600/564 |
| 2003/0212390 A1 | 11/2003 | Chen et al. | |
| 2005/0065509 A1 | 3/2005 | Coldwell et al. | |
| 2005/0277918 A1 * | 12/2005 | Shah ............... | A61N 1/06 606/41 |
| 2006/0052850 A1 * | 3/2006 | Darmos ............ | A61B 17/3421 607/101 |
| 2007/0032835 A1 | 2/2007 | Rittman | |
| 2008/0195152 A1 | 8/2008 | Altarac et al. | |
| 2008/0200972 A1 | 8/2008 | Rittman et al. | |
| 2008/0262490 A1 | 10/2008 | Williams | |
| 2009/0138046 A1 | 5/2009 | Altarac et al. | |
| 2009/0221153 A1 * | 9/2009 | Santangelo ............ | H01R 39/64 439/29 |
| 2009/0306604 A1 * | 12/2009 | Darmos ............ | A61B 18/1477 606/41 |
| 2010/0114093 A1 | 5/2010 | Mahapatra et al. | |
| 2010/0222747 A1 | 9/2010 | Wenchell et al. | |
| 2010/0249750 A1 | 9/2010 | Racz et al. | |
| 2011/0028836 A1 | 2/2011 | Ranpura et al. | |
| 2011/0288540 A1 | 11/2011 | Wright et al. | |
| 2011/0301578 A1 * | 12/2011 | Muniz-Medina ...... | A61B 90/92 606/1 |
| 2012/0203064 A1 | 8/2012 | Wynberg | |

(56) References Cited

U.S. PATENT DOCUMENTS

| | | |
|---|---|---|
| 2013/0345699 A1 | 12/2013 | Brannan et al. |
| 2014/0066917 A1 | 3/2014 | Cosman, Jr. et al. |
| 2014/0081260 A1 | 3/2014 | Cosman, Jr. et al. |
| 2014/0121658 A1 | 5/2014 | Cosman, Jr. et al. |
| 2014/0276800 A1 | 9/2014 | Batchelor et al. |
| 2015/0018822 A1* | 1/2015 | Racz .................. A61B 18/1477 606/41 |
| 2015/0182234 A1 | 7/2015 | Mahoney et al. |
| 2015/0305799 A1 | 10/2015 | Trieu |
| 2016/0206362 A1 | 7/2016 | Mehta et al. |
| 2016/0242822 A1 | 8/2016 | Altarac et al. |
| 2016/0278791 A1 | 9/2016 | Pellegrino et al. |
| 2017/0004951 A1 | 1/2017 | Weisz et al. |
| 2017/0049514 A1 | 2/2017 | Cosman |
| 2017/0172618 A1* | 6/2017 | Erkamp ................ A61B 8/4494 |
| 2018/0318061 A1 | 11/2018 | Clarke et al. |
| 2019/0110833 A1 | 4/2019 | Pellegrino et al. |
| 2019/0201057 A1 | 7/2019 | Altarac et al. |
| 2019/0223948 A1 | 7/2019 | Stewart et al. |
| 2019/0239941 A1* | 8/2019 | Schorr ................. A61B 18/148 |
| 2020/0038091 A1 | 2/2020 | Cao et al. |
| 2020/0038096 A1 | 2/2020 | Schepis et al. |
| 2020/0078048 A1* | 3/2020 | Hauger ............... A61N 1/36021 |
| 2020/0139144 A1 | 5/2020 | Cosman et al. |
| 2020/0146744 A1 | 5/2020 | Defosset et al. |
| 2020/0281646 A1 | 9/2020 | Pellegrino et al. |
| 2020/0330153 A1 | 10/2020 | Cosman, Jr. et al. |
| 2020/0383707 A1 | 12/2020 | Kidman et al. |
| 2021/0038298 A1 | 2/2021 | Scott et al. |
| 2021/0100592 A1 | 4/2021 | Seifert et al. |
| 2021/0121224 A1 | 4/2021 | Ranpura et al. |
| 2021/0236191 A1 | 8/2021 | Wang et al. |
| 2021/0298991 A1* | 9/2021 | Goldman ............... A61B 5/332 |
| 2021/0322063 A1 | 10/2021 | Altarac et al. |
| 2021/0369394 A1 | 12/2021 | Braido et al. |
| 2021/0393315 A1 | 12/2021 | McGregor et al. |
| 2021/0401458 A1* | 12/2021 | Baril .................. A61B 17/3423 |
| 2022/0000538 A1* | 1/2022 | Netzel ..................... H01R 39/08 |
| 2022/0061894 A1 | 3/2022 | Altarac et al. |
| 2022/0202484 A1 | 6/2022 | Wang |
| 2022/0202485 A1 | 6/2022 | Marusich et al. |
| 2022/0323147 A1 | 10/2022 | Hata et al. |
| 2022/0401085 A1* | 12/2022 | Cosman, Jr. ....... A61B 18/1477 |
| 2024/0108361 A1 | 4/2024 | Johnson et al. |
| 2024/0108394 A1 | 4/2024 | Bates et al. |
| 2024/0245445 A1 | 7/2024 | Bates |
| 2024/0245449 A1 | 7/2024 | Bates |
| 2024/0277384 A1 | 8/2024 | Malinowski |
| 2024/0423687 A1 | 12/2024 | Johnson et al. |
| 2024/0423701 A1 | 12/2024 | Johnson et al. |

FOREIGN PATENT DOCUMENTS

| | | |
|---|---|---|
| WO | 00/59394 | 10/2000 |
| WO | 2007121143 | 10/2007 |
| WO | 2014130031 | 8/2014 |
| WO | WO2022011115 | 1/2022 |

OTHER PUBLICATIONS

"Coolief* Cooled Radio Frequency Kit—Instructions for Use" Halyard—dated Feb. 9, 2017—8 pages.

Cobra R-F™—Epimed—URL: https://www.epimed.com/products/cobra-r-f/—retrieved Jan. 27, 2021.

Hyso et al., "Epimed Launches "Cobra" R-F™ Dual Use Radiofrequency Cannula" Cision—PR Web—Jan. 17, 2019 3 pages.

"Venom cannula and electrode system"—Stryker—retrieved Sep. 8, 2020 URL: https://www.stryker.com/us/en/interventional-spine/products/venom-cannula-and-electrode-system.html.

"RF Trident™ Cannulae" Diros Technology Inc. Nov. 11, 2017 URL: https://web.archive.org/web/20171117054945/https://dirostech.com/product-details/rf-tridenttrident-hybrid-cannulae/.

Cedeno et al., "Comparisons of Lesion Volumes and Shapes Produced by a Radiofrequency System with a Cooled, a Protruding, or a Monopolar Probe" Pain Physician 2017; 20:E915-E922 . ISSN 2150-1149.

Correspondence from Department of Health and Human Services to George Darmos at Diros Technology, Inc.—dated Jul. 30, 2015—11 pages.

Correspondence from Department of Health and Human Services to Christina McKee—dated Mar. 28, 2013; 7 pages.

U.S. Appl. No. 63/131,260, filed Dec. 28, 2020.

U.S. Appl. No. 63/130,519, filed Dec. 24, 2020.

Cosman et al. "Theoretical Aspects of Radiofrequency Lesions in the Dorsal Root Entry Zone," Neurosurgery, vol. 15, No. 6, p. 945-950 (1984).

U.S. Appl. No. 18/373,586, filed Sep. 27, 2023.

U.S. Appl. No. 18/373,626, filed Sep. 27, 2023.

Rhame EE, Levey KA, Gharibo CG. Successful treatment of refractory pudendal neuralgia with pulsed radiofrequency. Pain Physician. May-Jun. 2009;12(3):633-8. PMID: 19461829.

Todorov L. Pulsed radiofrequency of the sural nerve for the treatment of chronic ankle pain. Pain Physician. May-Jun. 2011;14(3):301-4. PMID: 21587334.

* cited by examiner

RF ABLATION SYSTEMS AND METHODS INCLUDING A CANNULA WITH CONTACTS OR A CONNECTOR

CROSS-REFERENCE TO RELATED APPLICATIONS

This application claims the benefit under 35 U.S.C. § 119(e) of U.S. Provisional Patent Application Ser. No. 63/138,092, filed Jan. 15, 2021, which is incorporated herein by reference.

FIELD

The present disclosure is directed to the area of radiofrequency (RF) ablation systems and methods of making and using the systems. The present disclosure is also directed to RF ablation system and methods that include a cannula with contacts or a connector, as well as methods of making and using the same.

BACKGROUND

Radiofrequency (RF) generators and electrodes can be used for pain relief or functional modification. Radiofrequency ablation (RFA) is a safe, proven means of interrupting pain signals, such as those coming from irritated facet joints in the spine, genicular nerves in the knee, and femoral and obturator nerves in the hip. Radiofrequency current is used to heat up a small volume of nerve tissue, thereby interrupting pain signals from that specific area. Radiofrequency ablation is designed to provide long-lasting pain relief.

For example, an RF electrode can be positioned near target tissue and then used to heat the target tissue by RF power dissipation of the RF signal output in the target tissue. Temperature monitoring of the target tissue by a temperature sensor in the electrode may be used to control the process.

BRIEF SUMMARY

One aspect is an RF ablation cannula that includes a cannula shaft; an active tip as part of, or coupled to, the cannula shaft; a cannula hub coupled to the cannula shaft, the cannula hub including at least a first cannula contact and a second cannula contact, wherein the first cannula contact is electrically coupled to the active tip; and a wire extending along the cannula shaft and attached to the active tip or cannula shaft to form a thermocouple, wherein the wire is electrically coupled to the second cannula contact.

In at least some aspects, the cannula hub includes a spacer disposed between the first and second cannula contacts. In at least some aspects, the first cannula contact differs from the second cannula contact in size or shape.

In at least some aspects, the cannula shaft is hollow and the either the cannula shaft or active tip has an opening. In at least some aspects, the cannula hub defines a port for injection of fluid into the cannula hub, through the hollow cannula shaft, and out the opening. In at least some aspects, the RF ablation cannula further includes an injection tube extending from the cannula hub, wherein the injection tube defines a port for injection of fluid into the injection tube, through the cannula hub, through the hollow cannula shaft, and out the opening.

In at least some aspects, the active tip is sharp. In at least some aspects, the cannula shaft is conductive, the cannula further including insulation extending along the cannula shaft from the cannula hub to the active tip. In at least some aspects, the wire is disposed over, or embedded within, the insulation.

Another aspect is an RF ablation system that includes any of the RF ablation cannulas described above and a coupler that includes a first coupler contact and a second coupler contact configured for attaching and electrically coupling to the first contact and second contact of the RF ablation cannula and a cable electrically coupled to the first and second coupler contacts and terminating in a connector configured to couple to an RF generator.

In at least some aspects, the coupler further includes a coupler clip with the first and second coupler contacts extending from the coupler clip, wherein the coupler clip is configured and arranged to facilitate attachment of the coupler to the cannula hub of the RF ablation cannula. In at least some aspects, the coupler clip includes a first wing from which the first and second coupler contacts extend, a second wing, and an arm attached to, and between, the first and second wings. In at least some aspects, the arm is biased to bring the first and second contacts toward each other.

In at least some aspects, the first and second cannula contacts are ring contacts and the first and second coupler contacts are partial ring contacts configured to circumferentially engage a portion of the first or second cannula contacts, respectively. In at least some aspects, the first and second cannula contacts have different shapes or sizes and the first and second coupler contacts have shapes and sizes corresponding to the first or second cannula contacts, respectively.

In at least some aspects, the RF ablation system further includes an RF generator configured to electrically couple to the coupler.

A further aspect is an RF ablation cannula that includes a cannula shaft; an active tip as part of, or coupled to, the cannula shaft; a cannula hub coupled to the cannula shaft, the cannula hub including a cannula connector, the cannula connector including at least a first connector contact and a second connector contact, wherein the first connector contact is electrically coupled to the active tip; and a wire extending along the cannula shaft and attached to the active tip or cannula shaft to form a thermocouple, wherein the wire is electrically coupled to the second connector contact.

In at least some aspects, the cannula shaft is conductive, the cannula further including insulation extending along the cannula shaft from the cannula hub to the active tip. In at least some aspects, the wire is disposed over, or embedded within, the insulation.

Yet another aspect is an RF ablation system that includes any of the RF ablation cannulas of the preceding two paragraphs; an RF generator; and a cable configured to electrically couple the RF generator to the cannula connecter of the RF ablation cannula.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present disclosure is directed to the area of radiofrequency (RF) ablation systems and methods of making and using the systems. The present disclosure is also directed to RF ablation system and methods that include a cannula with contacts or a connector, as well as methods of making and using the same.

Figure 1:
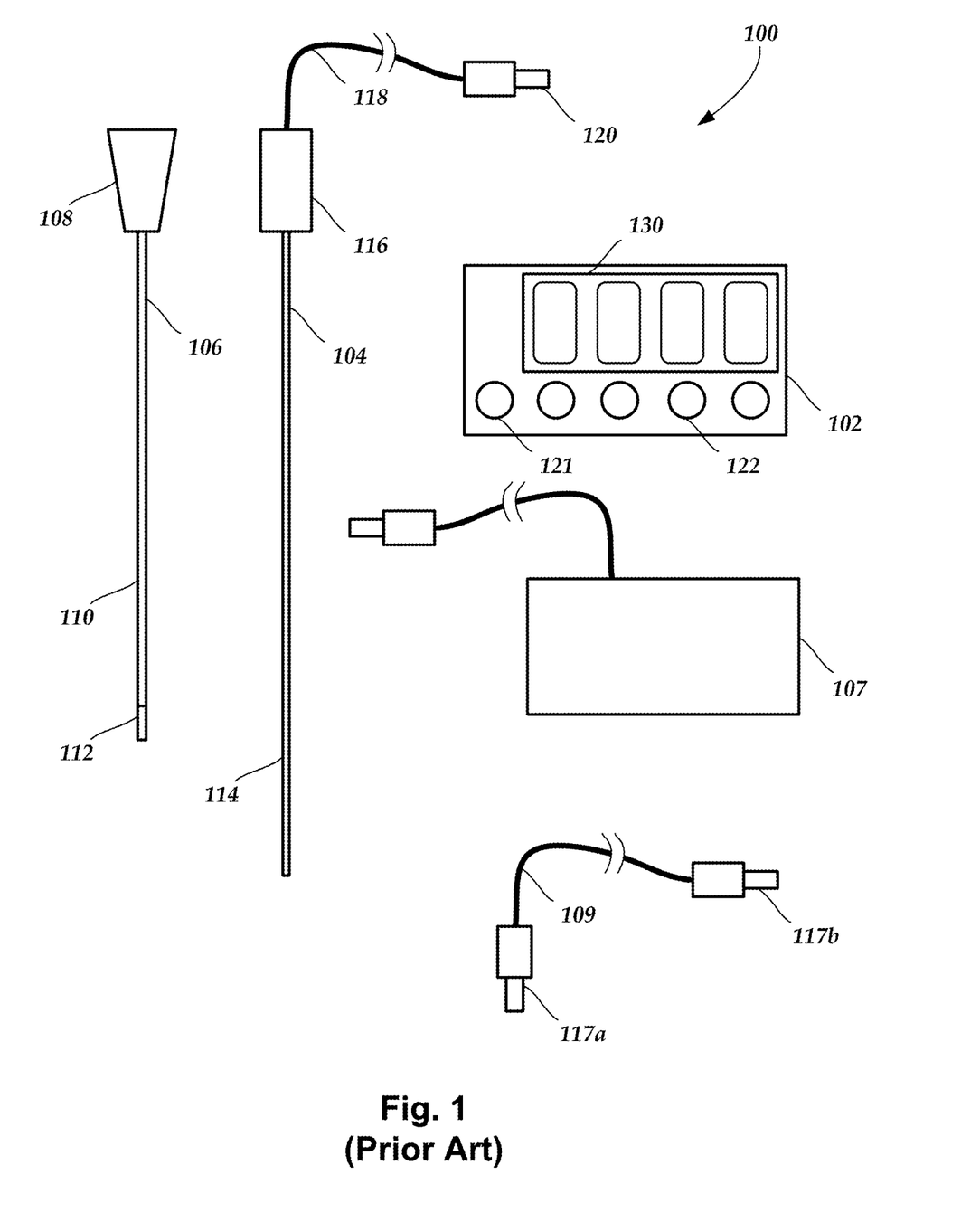
FIG. 1 is a schematic side view of components of one embodiment of a conventional RF ablation system.

FIG. 1 illustrates one embodiment of a conventional RF ablation system 100 that includes a RF generator 102, a RF electrode 104, a cannula 106, a ground pad 107, and an optional extension cable 109. The cannula 106 includes a cannula hub 108, an insulated shaft 110, and an active tip 112. The insulated shaft 110 is hollow for receiving the RF electrode 104. When inserted, the RF electrode 104 contacts, and energizes, the active tip 112 of the cannula 106 to produce RF ablation. The RF electrode 104 includes an electrode shaft 114, an electrode hub 116, a cable 118 that is electrically coupled to the electrode shaft 114, and a connector 120 for connecting to a port 122 of the RF generator 102 to energize the electrode shaft 114 via the cable 118 and connector 120. The optional adapter or extension 109 includes a cable 119 and connectors 117a, 117b for coupling the RF electrode 104 to the RF generator 102. It will be recognized that other RF ablation systems utilize the RF electrode 104 for ablation instead of, or in addition to, the cannula 106.

The RF generator 102 can include one or more ports 122 and at least one screen 130. In at least some embodiments, each port 122 is associated with a portion of the screen 130 (or a different screen) and can receive the connector 120 from an RF electrode 104. Information such as current, voltage, status, or the like or any combination thereof can be displayed on the screen 130. In at least some embodiments, each port 122 corresponds to an independent channel for operating a RF electrode 104. The RF generator 102 also includes a ground port 121 for attachment of the ground pad 107.

Examples of RF generators and RF ablation systems and methods of making and using the RF generators and RF ablation systems can be found at, for example, U.S. Pat. Nos. 9,717,552; 9,956,032; 10,111,703; 10,136,937; 10,136,942; 10,136,943; 10,194,971; 10,342,606; 10,363,063; 10,588,687; 10,631,915; 10,639,098; and 10,639,101 and U.S. Patent Application Publications Nos. 2014/0066917; 2014/081260; and 2014/0121658, all of which are incorporated herein by reference in their entireties.

One failure mode for the convention RF electrode is the electrode shaft breaking during insertion or otherwise. In addition, the RF electrode often must be removed to inject fluid through the cannula to the treatment site.

Figure 2:
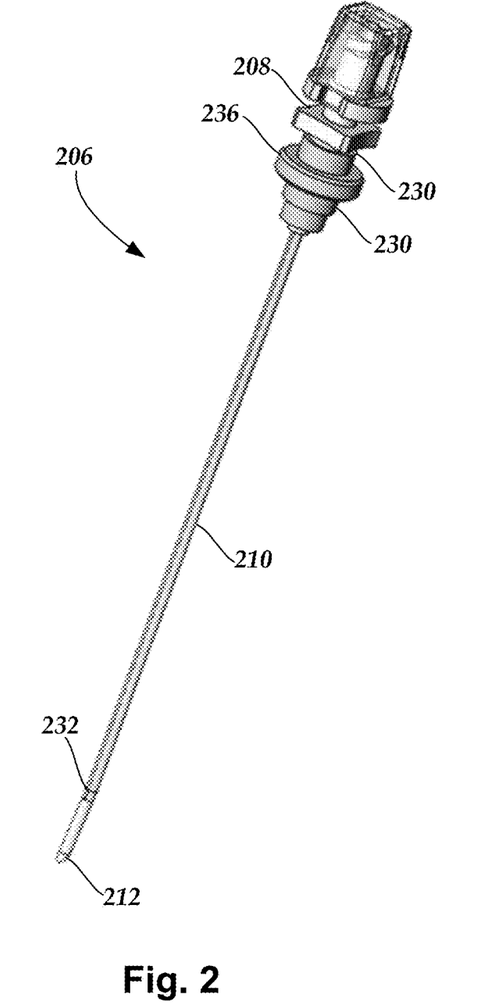
FIG. 2 is a schematic perspective view of one embodiment of a cannula with contacts.
Figure 3:
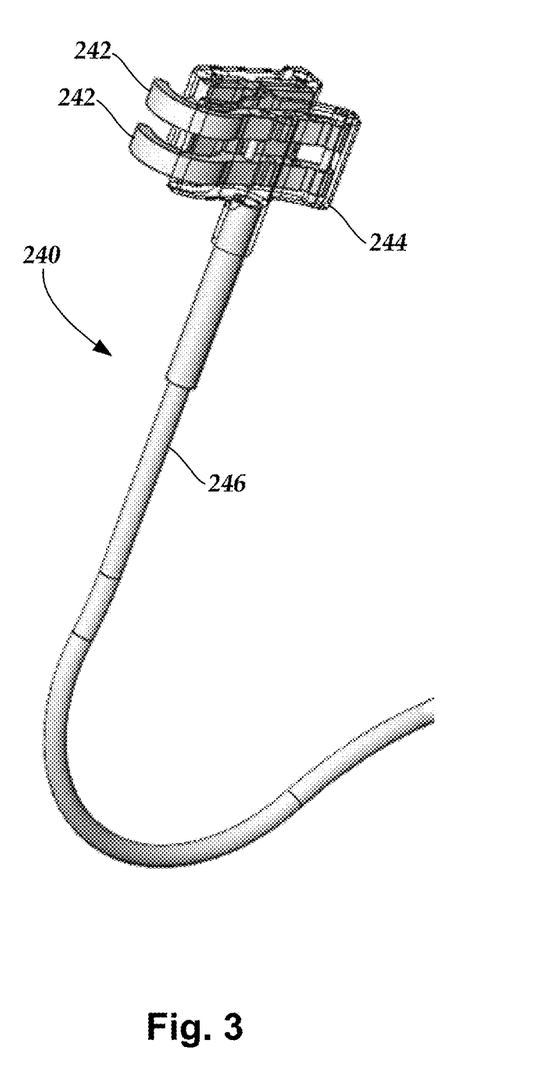
FIG. 3 is a schematic perspective view of one embodiment of a coupler for coupling to the cannula of FIG. 2.
Figure 4:
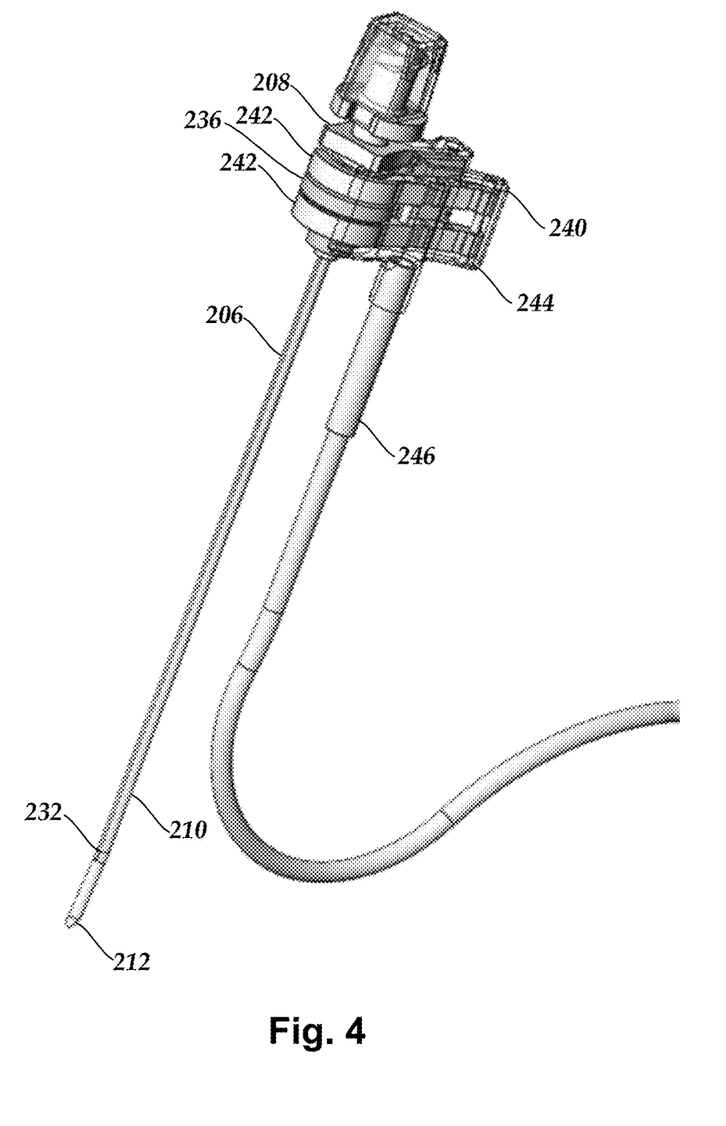
FIG. 4 is a schematic perspective view of the coupler of FIG. 3 coupled to the cannula of FIG. 2.

As disclosed herein, the cannula can act as an RF electrode by placing contacts on the cannula for coupling to the RF generator and including a coupler to couple the cannula to the RF generator. FIG. 2 illustrates one embodiment of a cannula 206 that includes a cannula hub 208, a shaft 210, an active tip 212, cannula contacts 230, and a temperature sensing element, such as a thermocouple 232. FIG. 3 illustrates one embodiment of the coupler 240 that includes coupler contacts 242, a coupler clip 244, and a cable 246 with a connector (such as connector 120 of FIG. 1) for connecting to the RF generator 102 (FIG. 1) or an extension 109 (FIG. 1). FIG. 4 illustrates the coupler 240 attached to the cannula 206 so that the coupler contacts 242 engage and electrically couple to the cannula contacts 230. It will be understood that the cannula 206 and coupler 240 can be used with the RF generator 102, ground pad 107, and optional extension cable 109 of FIG. 1 or any other suitable components of an RF ablation system.

In at least some embodiments, the shaft 210 of the cannula 206 is hollow and optionally has at least one opening (not shown) at the active tip 212 or along the shaft. The active tip 212 of the cannula 206 is electrically coupled to one of the cannula contacts 230. In at least some embodiments, the shaft 210 and active tip 212 are formed of biocompatible material, such as, for example, stainless steel, titanium, nitinol, conductive epoxy, conductive polymers, or the like or any other suitable biocompatible conductive material. In at least some embodiments, the active tip 212 can be an exposed distal portion of the shaft 210. In at least some embodiments, a portion of the shaft 210 is covered by an insulation 235, such as a plastic or polymeric material (for example, heat shrink tubing), between the cannula hub 208 and the active tip 212.

In at least some embodiments, the active tip 212 of the cannula 206 can have a sharpened region 233 (FIG. 5) so that cannula can act as a needle. In other embodiments, the active tip 212 of the cannula can be blunt. The cannula 206 or the active tip 212 (or both) can be straight or curved. In at least some embodiments, the active tip 212 can be dimpled or contain other features to increase echogenicity or surface area. The cannula 206 or active tip 212 can have any suitable length. The cannula 206 can have any suitable gauge or diameter.

Figures 5, 6A:
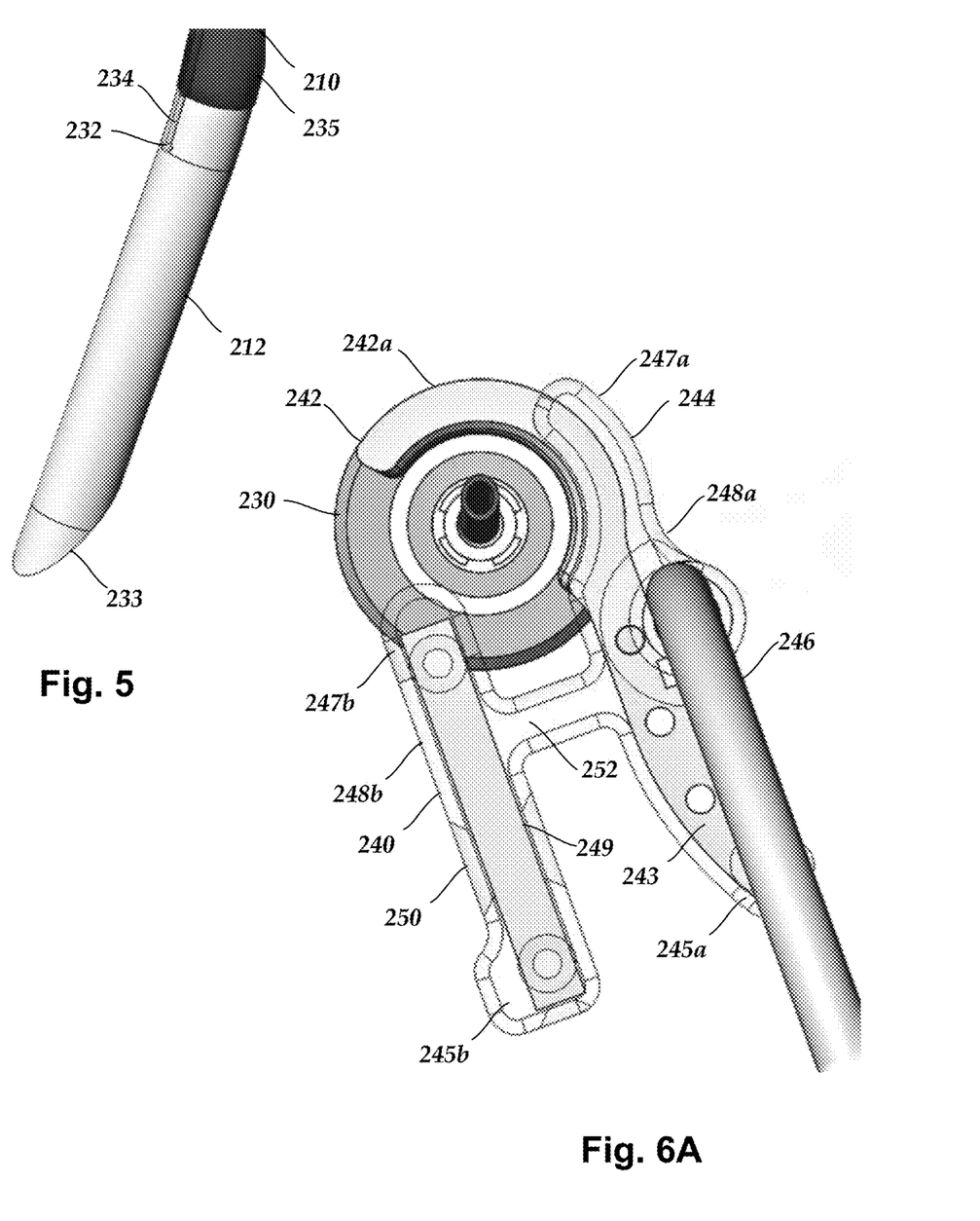
FIG. 5 is a schematic perspective close-up view of a distal portion of the cannula of FIG. 2.
FIG. 6A is schematic bottom view of the coupler of FIG. 3 coupled to the cannula of FIG. 2.

FIG. 5 is a close-up view of the active tip 212 and surrounding portions of the cannula 206. In at least some embodiments, the temperature sensing element is a thermocouple 232 formed by a wire 234 attached (for example, welded) to the active tip 212 (or other portion of the shaft 210) of the cannula 206. The wire 234 is made of different material (for example, constantan or the like) than the active tip 212 (or other portion of the shaft 210) of the cannula. In at least some embodiments, the wire 234 extends along the shaft 210 of the cannula 206. In at least some embodiments, the wire 234 is insulated with a distal portion of the wire exposed by removal of the insulation and attached to the active tip 212 (or other portion of the shaft 210) of the cannula. In at least some embodiments, the wire 234 is insulated from the shaft 210 by the insulation 235 on at least a portion of the shaft. In at least some embodiments, the wire 234 can be embedded in, or covered by, the insulation 235. In other embodiments, the wire 234 is disposed over the insulation 235. In at least some embodiments, the wire 234 can be attached to the cannula 206 using adhesive (in at least some embodiments, an electrically insulative adhesive).

The thermocouple 232 illustrated in FIGS. 2, 4, and 5 is particularly useful as the thermocouple is disposed near the tissue that is to be ablated or stimulated by the active tip 212 of the cannula 206. In some embodiments, the welding point of the wire 234 of the thermocouple 232 can be covered by the insulation 235, an adhesive, or other coating that is thermally conductive to produce a shielded thermocouple that is not in direct contact with the tissue. In other embodiments, the welding point of the wire 234 of the thermocouple 232 is in direct contact with the tissue when the cannula 230 is positioned.

Returning to FIGS. 2 and 4, in at least some embodiments, the cannula contacts 230 are ring contacts that extend around the circumference of the shaft 210 or cannula hub 208. In at least some embodiments, ring contacts can be advantageous because the coupler 240 can be attached to the ring contacts without a particular rotational orientation. In other embodiments, the cannula contacts 230 can have a shape other than a ring including, but not limited to, a partial ring, a contact pad, a square, a rectangle, a hexagon, an octagon, any other polygon, any other regular or irregular shape, or the like or any combination thereof. In at least some embodiments, the cannula contacts 230 differ from each other in one or more aspects such as, for example, size, diameter, width, color, shape, profile, material, or the like or any combination thereof so that the user can determine whether the coupler 240 is coupled correctly to the cannula contacts 230 (i.e., that each of the coupler contacts 242 couples to the correct cannula contact 230.) In at least some embodiments, the one or more aspects of difference are visible. In at least some embodiments, the one or more aspects of difference prevent or substantially hinder attachment of the coupler 240 incorrectly.

In at least some embodiments, one of the cannula contacts 230 is electrically coupled (for example, attached via a weld, solder, or the like) to the wire 234 of the thermocouple 232. The other cannula contact is electrically coupled to the cannula 206 (for example, attached via a weld, solder, or the like and optionally using a wire (not shown) between the cannula contact and the cannula) to energize the active tip 212. In at least some embodiments, one of the cannula contacts 230 is electrically coupled to the shaft 210 of the cannula 206 if the shaft is made of an electrical material. In at least some embodiments, one of the cannula contacts 230 is electrically coupled to the active tip 212 using a wire (not shown) extending along the shaft 210 (either along the exterior of the shaft or in a lumen within the shaft) to the active tip.

In at least some embodiments, the cannula contacts 230 are separated by a spacer 236. In at least some embodiments, the spacer 236 has a larger diameter than the cannula contacts 230 to prevent inadvertent improper coupling or slipping of the coupler contacts 242.

RF energy is provided to the active tip 212 of the cannula 206 using one of the cannula contacts 230 with the return path for current being the ground pad 107 or another RF electrode or cannula. In at least some embodiments, the temperature sensing element uses both of the cannula contacts 230 as the thermocouple 232 includes the junction between the wire 232 and the active tip 212 (or shaft 210) of the cannula 206.

Returning to FIG. 3, the coupler 240 includes coupler contacts 242, coupler clip 244, cable 246, and a connector (not shown). In at least some embodiments, the coupler 240 is reusable. In at least some embodiments, the coupler 240 is autoclavable. In at least some embodiments, the coupler contacts 242 have a shape that is complementary to the shape of the cannula contacts 230. For example, as illustrated in FIG. 3, the coupler contacts 242 can have a partial ring shape to fit around (for example, circumferentially engage) a portion of ring-shaped cannula contacts 230. In at least some embodiments, the inner diameter of the coupler contacts 242 is the same as the outer diameter of the cannula contacts 230.

Figure 6B:
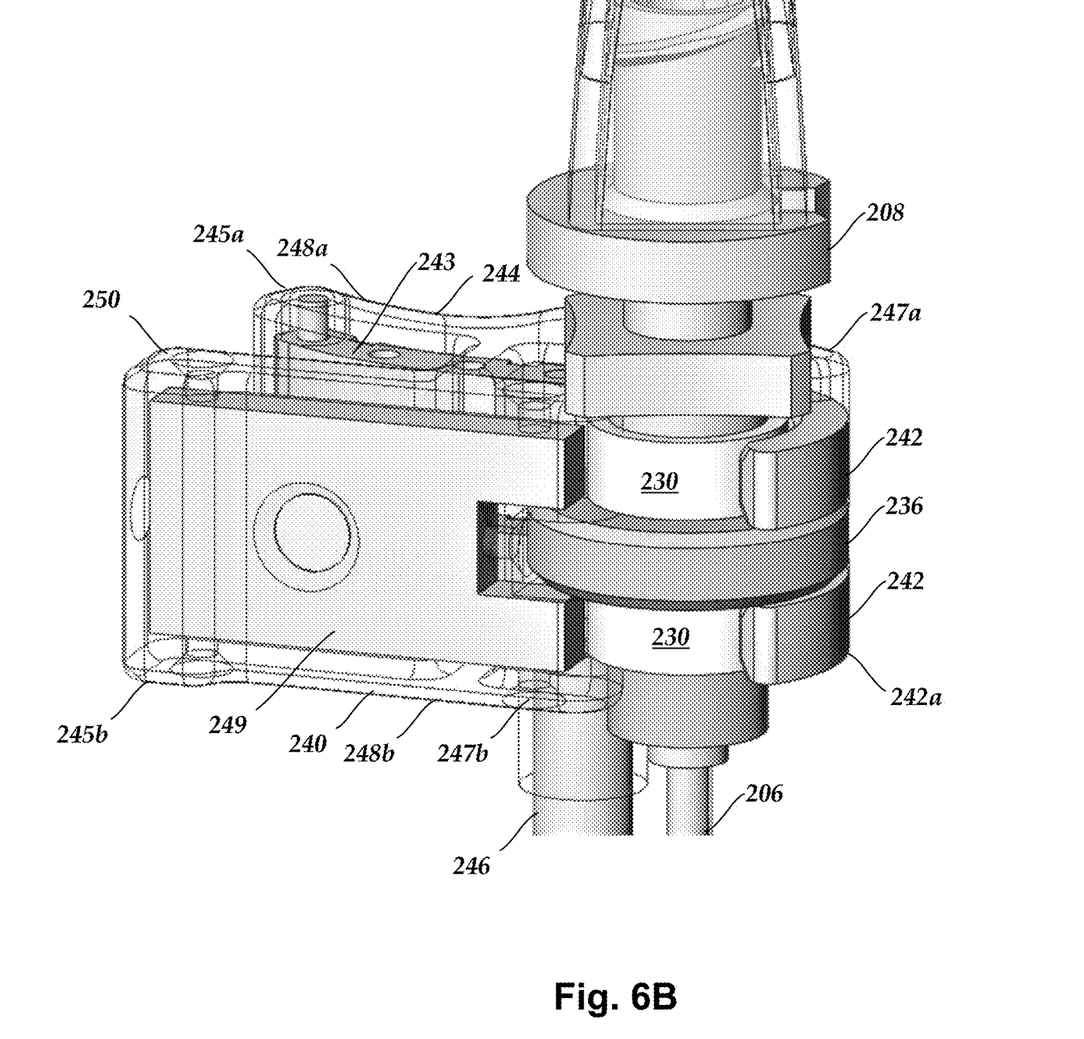
FIG. 6B is schematic perspective close-up view of the coupler of FIG. 3 coupled to the cannula of FIG. 2.

FIG. 6A illustrates a bottom view of the coupler 240 showing one of the coupler contacts 242 coupled to one of the cannula contacts 230 and FIG. 6B is a close-up, side view of this arrangement. In this embodiment, each of the coupler contacts 242 extends into the coupler clip 244 with a shank 243 extending from a contact portion 242a of the coupler contact into one wing 248a of the coupler clip. Any other suitable arrangement for coupling the coupler contacts 242 to the coupler clip 244 can be used. In at least some embodiments, the opposing wing 248b of the coupler clip 244 can include a bar 249. In at least some embodiments, an insulative material 250 (which may also be flexible) is disposed around the bar 249 and shank 243 for gripping by a user. In at least some embodiments, the bar 249 includes prongs 251 that flank the spacer 236 when the coupler clip 244 is coupled to the cannula hub 208, as illustrated in FIG. 6B. In at least some embodiments, the two coupler contacts 242 also flank the spacer 236.

In at least some embodiments, an arm 252 connects wings 248a, 248b at a position spaced apart from end portions 245a, 245b, 247a, 247b of the wings. In at least some embodiments, the arm 252 is sufficiently flexible or stretchable (or both) to allow a user to grasp distal end portions 245a, 245b of the wings 248a, 248b and increase the separation between the proximal end portions 247a, 247b of the wings to facilitate attachment and detachment of the coupler clip 244 to/from the cannula contacts 230 on the cannula hub 208. In at least some embodiments, the arm 252 is biased to draw the proximal end portions 247a, 247b of the wings 248a, 248b together when force is not applied to the distal end portions 245a, 245b of the wings. In at least some embodiments, the material of the arm 252 provides biasing. In at least some embodiments, the arm 252 includes a biasing element such as a spring or the like to provide biasing.

Figure 7A:
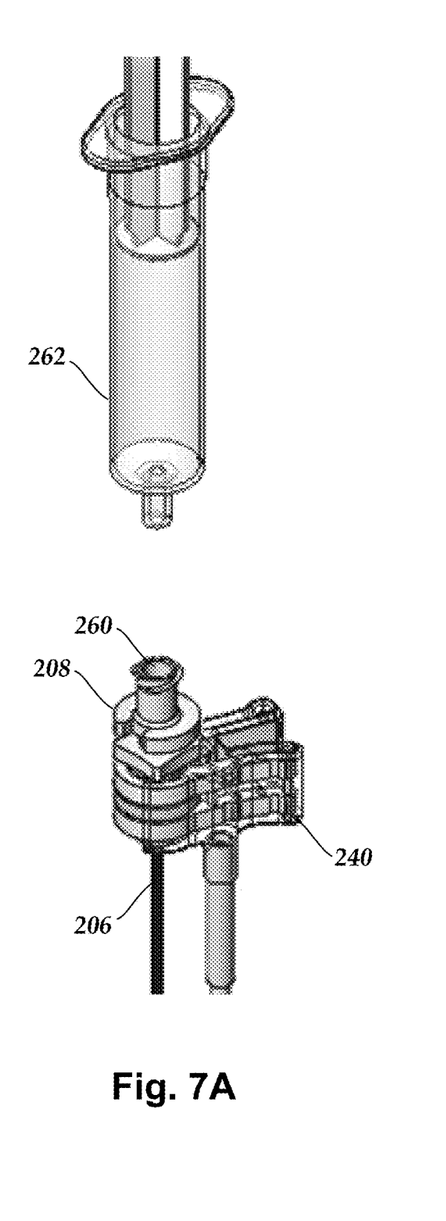
FIG. 7A is a schematic perspective view of one embodiment of a cannula with contacts and an injection port, as well as a syringe.
Figure 7B:
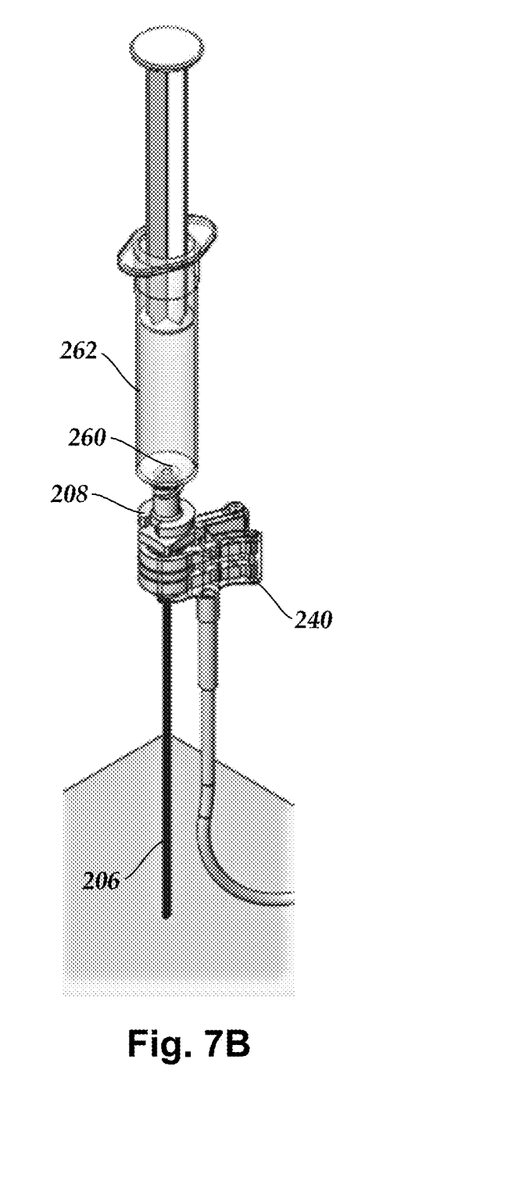
FIG. 7B is a schematic perspective view of the syringe inserted into the injection port of the cannula of FIG. 7A.

In at least some embodiments, the cannula hub 208 includes an injection port 260, as illustrated in FIGS. 7A and 7B. A syringe 262 or other source of fluid can be coupled to the injection port 260 to inject fluid through the cannula hub 208 and cannula shaft 235 and out an opening in the active tip 212 (or elsewhere along the shaft 210).

Figure 8:
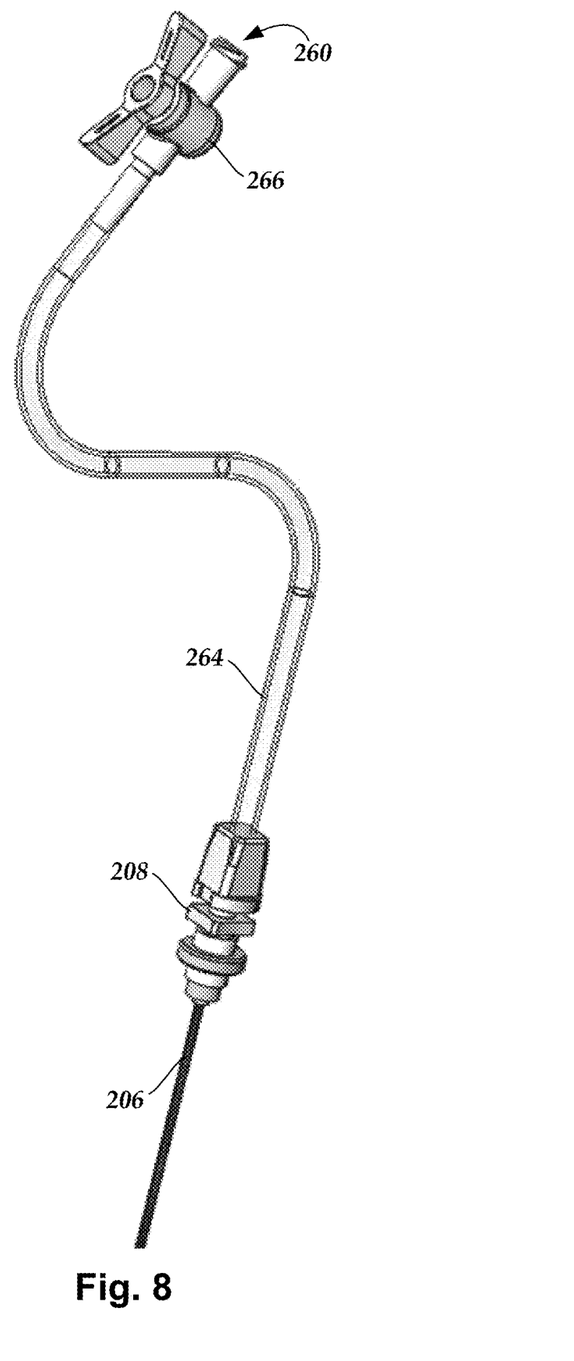
FIG. 8 is a schematic perspective view of one embodiment of a cannula with contacts and an injection tube with an injection port.

In at least some embodiments, the cannula hub 208 includes an injection tube 264 extending from the cannula hub 208 with the injection port 260 at the end of the injection tube, as illustrated in FIG. 8. In at least some embodiments, the injection tube 264 includes a valve 266 for opening or closing the tube.

Figure 9A:
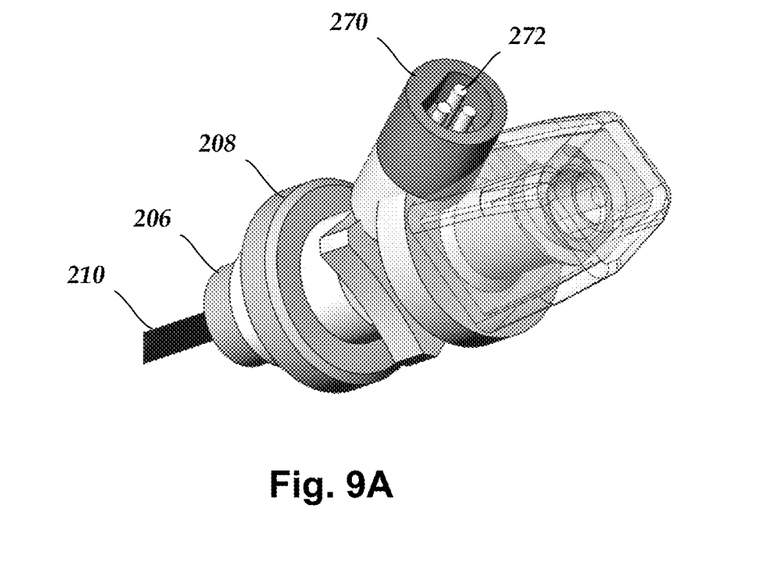
FIG. 9A is a schematic perspective close-up view of one embodiment of a portion of a cannula with contacts and a connector in the cannula hub.
Figure 9B:
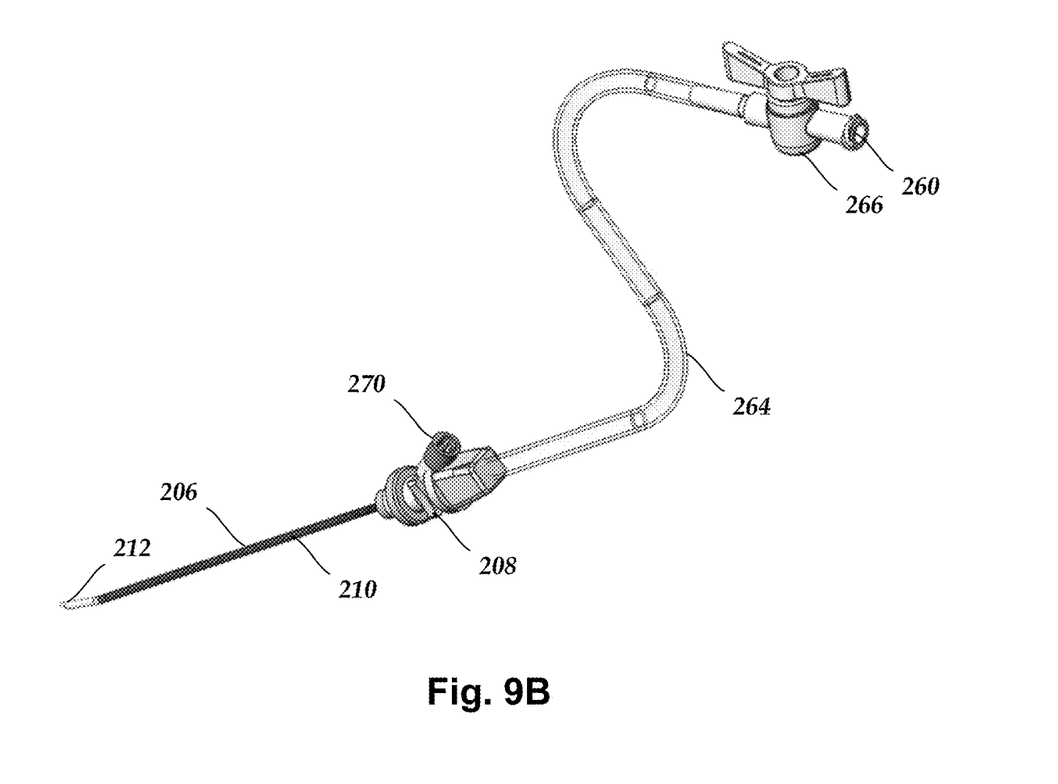
FIG. 9B is a schematic perspective view of the cannula of FIG. 10A with an injection tub extending from the cannula hub.

FIGS. 9A and 9B illustrate another embodiment of a cannula 206 in which a connector 270 is disposed in the cannula hub 208. The connector 270 is an alternative to the coupler 242 and includes connector contacts 272 (such as pins, as illustrated in FIG. 9A, or contact pads or the like or any combination thereof) that couple to the cannula contacts 230 or directly to the wire 234 of the thermocouple 232 and the cannula 206 to energize active tip 212. In at least some embodiments that include connector 270, the cannula hub 208 does not include cannula contacts 230. The connector 270 can be coupled to the RF generator 102 (FIG. 1) using the extension 109 (FIG. 1) or any other suitable connection components or technique. Optionally, the cannula 206 can include an injection port 260 (FIGS. 7A and 7B) or an injection tube (FIG. 8 and FIG. 9B).

Figure 10:
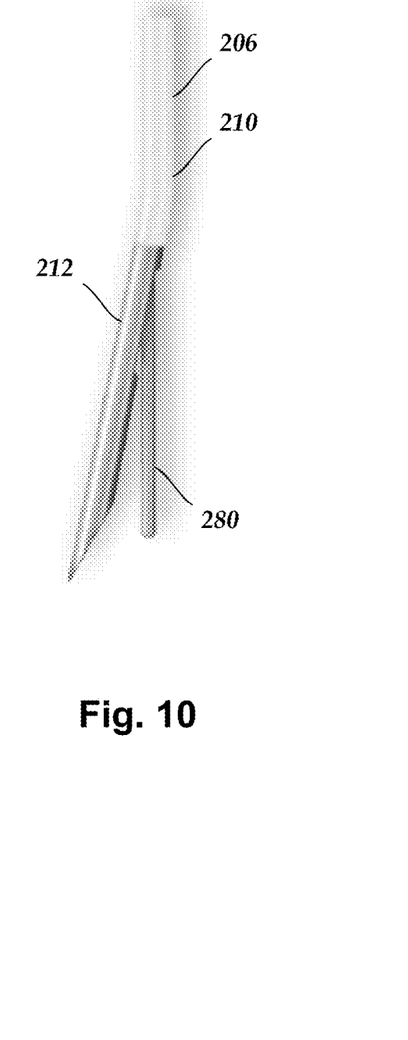
FIG. 10 is a schematic side view of one embodiment of a portion of a cannula with a side electrode extending from the cannula shaft.

FIG. 10 illustrates an alternative active tip 212 of cannula 206 which includes a side electrode 280. In at least some embodiments, the side electrode 280 can be a stylet that is inserted through the injection port 260 or other port on the cannula hub 208. In at least some embodiments, the side electrode 280 can be permanently disposed in the cannula 206 and extended from, or retracted into, the shaft 210 (or other portion) of the cannula 206. Arrangements and methods for extending or retracting the side electrode 280 can be found in, for example, U.S. Provisional Patent Application Ser. No. 63/131,260 (entitled "RF Ablation Systems and Methods Using an Integrated Cannula and Electrode", filed Dec. 28, 2020.

An example of using the cannula 206 includes placing the cannula in a patient and connecting the coupler 240 (or connector 270) to the RF generator 102 and the cannula. If desired, the clinician can perform motor testing or stimulation using the cannula 206 and the RF generator 102. Also, if desired, the clinician can inject anesthetic or other fluid into the port 260, if available, in the cannula hub 208 or the cannula tube 262 attached the cannula hub. The cannula 206 can be used to perform RF ablation with the coupler 240 coupled to the RF generator 102 and the cannula. After treatment, the cannula 206 can be removed from the patient.

The above specification provides a description of the structure, manufacture, and use of the invention. Since many embodiments of the invention can be made without departing from the spirit and scope of the invention, the invention also resides in the claims hereinafter appended.

What is claimed as new and desired to be protected by Letters Patent of the United States is:

1. An RF ablation system, comprising:
 an RF ablation cannula comprising:
  a cannula shaft;
  an active tip as part of, or coupled to, the cannula shaft;
  a cannula hub coupled to the cannula shaft, the cannula hub comprising at least a first cannula contact and a second cannula contact, wherein each of the first cannula contact and the second cannula contact comprises a ring contact having an outer diameter defining an outer cylindrical contact surface configured for electrically coupling to an external contact, wherein the first cannula contact is electrically coupled to the active tip; and
  a wire extending along the cannula shaft and attached to the active tip or cannula shaft to form a thermocouple, wherein the wire is electrically coupled to the second cannula contact; and
 a coupler comprising:
  a first coupler contact and a second coupler contact configured for attaching and electrically coupling to the first cannula contact and second cannula contact of the RF ablation cannula, respectively, wherein the first coupler contact and the second coupler contact each have a partial ring shape complementary to the outer cylindrical contact surfaces of the first cannula contact and second cannula contact, respectively,
  a cable electrically coupled to the first and second coupler contacts and terminating in a connector configured to couple to an RF generator, and
  a coupler clip with the first and second coupler contacts directly attached to and extending from the coupler clip, wherein the coupler clip is configured and arranged to facilitate attachment of the coupler to the cannula hub of the RF ablation cannula, wherein the coupler clip comprises a first wing from which the first and second coupler contacts extend and to which the first and second coupler contacts are directly attached, a second wing, and an arm attached to, and between, the first and second wings.

2. The RF ablation system of claim 1, wherein the cannula hub comprises a cylindrical spacer disposed between the first and second cannula contacts.

3. The RF ablation system of claim 2, wherein an outer diameter of the cylindrical spacer is greater than the outer diameters of the first and second cannula contacts.

4. The RF ablation system of claim 1, wherein the first cannula contact differs from the second cannula contact in size or shape.

5. The RF ablation system of claim 1, wherein the cannula shaft is hollow and either the cannula shaft or active tip has an opening.

6. The RF ablation system of claim 5, wherein the cannula hub defines a port for injection of fluid into the cannula hub, through the hollow cannula shaft, and out the opening.

7. The RF ablation system of claim 5, further comprising an injection tube extending from the cannula hub, wherein the injection tube defines a port for injection of fluid into the injection tube, through the cannula hub, through the hollow cannula shaft, and out the opening.

8. The RF ablation system of claim 1, wherein the active tip is sharp.

9. The RF ablation system of claim 1, wherein the cannula shaft is conductive, the cannula further comprising insulation extending along the cannula shaft from the cannula hub to the active tip.

10. The RF ablation system of claim 9, wherein the wire is disposed over, or embedded within, the insulation.

11. The RF ablation system of claim 1, wherein the arm is biased to bring the first and second wings toward each other.

12. The RF ablation system of claim 1, wherein the first and second coupler contacts are configured to circumferentially engage a portion of the outer cylindrical contact surface of the first or second cannula contacts, respectively.

13. The RF ablation system of claim 12, wherein the first and second coupler contacts have an inner diameter equal to an outer diameter of the first and second cannula contacts.

14. The RF ablation system of claim 1, further comprising the RF generator configured to electrically couple to the coupler.

15. The RF ablation system of claim 1, wherein the first and second cannula contacts are disposed circumferentially relative to a longitudinal axis defined by at least a proximal portion of the cannula shaft.

16. The RF ablation system of claim 1, wherein the first and second cannula contacts are disposed circumferentially around the cannula shaft.

17. The RF ablation system of claim 1, wherein the ring contact of each of the first and second cannula contacts defines an inner diameter.

18. The RF ablation system of claim 1, wherein the second wing comprises a bar with an insulative material disposed around the bar for gripping by a user.

19. The RF ablation system of claim 18, wherein the cannula hub comprises a cylindrical spacer disposed between the first and second cannula contacts and the bar comprises prongs that are configured to flank the cylindrical spacer.

20. The RF ablation system of claim 1, wherein the first wing comprises first and second shanks extending to the first and second coupler contacts, respectively, and an insulative material disposed over at least a portion of each of the first and second shanks for gripping by a user.

* * * * *